United States Patent
Iwasaki

(10) Patent No.: US 9,618,390 B2
(45) Date of Patent: Apr. 11, 2017

(54) OPTICAL DEVICE AND ELECTRONIC APPARATUS

(75) Inventor: Masanori Iwasaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 13/285,512

(22) Filed: Oct. 31, 2011

(65) Prior Publication Data
US 2012/0133944 A1    May 31, 2012

(30) Foreign Application Priority Data

Nov. 30, 2010   (JP) ................ 2010-266296

(51) Int. Cl.
*G01J 3/02* (2006.01)
*G01J 3/18* (2006.01)
*G02B 27/10* (2006.01)

(52) U.S. Cl.
CPC .......... *G01J 3/0294* (2013.01); *G01J 3/0205* (2013.01); *G01J 3/0248* (2013.01); *G01J 3/0256* (2013.01); *G01J 3/1804* (2013.01); *G02B 27/108* (2013.01); *G02B 27/1086* (2013.01)

(58) Field of Classification Search
CPC .................................................. G01J 3/0294
USPC ....................................................... 356/326
See application file for complete search history.

(56) References Cited

U.S. PATENT DOCUMENTS

| | | | | |
|---|---|---|---|---|
| 4,945,220 A * | 7/1990 | Mallory et al. | ............ | 250/201.3 |
| 5,221,959 A * | 6/1993 | Ohyama et al. | ............ | 356/326 |
| 5,446,534 A * | 8/1995 | Goldman | ............ | 356/128 |
| 5,731,874 A * | 3/1998 | Maluf | ............ | G01J 3/02 |
| | | | | 257/E27.129 |
| 5,812,262 A * | 9/1998 | Ridyard et al. | ............ | 356/328 |
| 6,100,974 A * | 8/2000 | Reininger | ............ | 356/300 |
| 6,160,662 A * | 12/2000 | Uchida | ............ | G02B 21/0088 |
| | | | | 359/368 |
| 2002/0105725 A1* | 8/2002 | Sweatt | ............ | G01J 3/18 |
| | | | | 359/566 |
| 2004/0120042 A1* | 6/2004 | Nagase | ............ | G01J 3/02 |
| | | | | 359/489.19 |
| 2004/0246477 A1* | 12/2004 | Moon et al. | ............ | 356/300 |
| 2005/0264672 A1 | 12/2005 | Takahashi | | |
| 2007/0165221 A1* | 7/2007 | Deck et al. | ............ | 356/326 |
| 2008/0073485 A1* | 3/2008 | Jahn et al. | ............ | 250/201.2 |

FOREIGN PATENT DOCUMENTS

| | | |
|---|---|---|
| JP | 2005-337793 | 12/2005 |
| JP | 2009-039280 | 2/2009 |

* cited by examiner

*Primary Examiner* — Tarifur Chowdhury
*Assistant Examiner* — Omar Nixon
(74) *Attorney, Agent, or Firm* — Michael Best & Friedrich LLP

(57) ABSTRACT

An optical device includes: an image-forming optical system forming an image of light from a subject; an imaging unit receiving light of the image formed by the image-forming optical system; a reflection spectroscopic device covering a given area in an imaging area of the imaging unit; and a spectrum detection unit detecting a spectroscopic spectrum of light reflected by the reflection spectroscopic device.

18 Claims, 9 Drawing Sheets

OPTICAL DEVICE AND ELECTRONIC APPARATUS

FIELD

The present disclosure relates to an optical device obtaining both of an image and a spectroscopic spectrum of a subject, and an electronic apparatus using the optical device.

BACKGROUND

In recent years, a spectral imaging camera acquiring a spectroscopic spectrum of a subject and image data of the subject has been developed and widely applied to various fields.

For example, in JP-A-2009-39280 (Patent Document 1), there is disclosed a technique in which a spectrum of emitted light or reflected light from a lesion such as a cancer is measured the thereby identify the lesion of a subject in an endoscope for examining the inside of an organ.

In the endoscope, light from the subject collected by a lens is incident on a diffraction grating through a slit. Then, the light separated by the diffraction grating forms an image on an imaging unit by a lens arranged in the subsequent stage to thereby acquire a spectroscopic spectrum of the light from the subject.

In JP-A-2005-337793 (Patent Document 2), there is disclosed a technique in which different light receiving areas are provided for acquiring the image as well as for acquiring the spectroscopic spectrum respectively. That is, light from the subject is incident on the diffraction grating and zero-order light forms an image on the light receiving area dedicated for the zero-order light, thereby acquiring the image of the subject. Additionally, first-order light of the diffraction grating is received by the light receiving area dedicated for the first-order light, thereby detecting the spectroscopic spectrum.

SUMMARY

However, in the above Patent Document 1, the slit is arranged at the image-forming position of the subject by the lens arranged on the side of the subject. Therefore, it is difficult to obtain data other than data of a subject region in the one-dimensional direction corresponding to a place where on opening of the slit is arranged on an image-forming surface.

Accordingly, in order to obtain two-dimensional image data of the whole subject, after data at respective regions is acquired by scan-moving the whole components in a light path from the slit to the imaging unit, respective data have to be combined to form two-dimensional data as described in the above Patent Document 1. Therefore, obtained data will be the one without real-time performance. It is also disadvantageous for miniaturizing the device as a scanning mechanism is necessary.

Additionally, the image of the subject which has been formed once is diffracted by the slit, and the diffracted light forms the image on the imaging device by another lens again. That is, it is necessary to form the image of the subject twice, which complicates an optical system.

In the above Patent Document 2, it is necessary to illuminate only a region on the subject where spectrum data is desired to be acquired.

In the Patent Document 2, the diffraction grating separating light from the subject is arranged in the vicinity of a Fourier surface, namely, in the vicinity of a diaphragm. Therefore, all the light from respective regions of the subject in a field angle is incident on the diffraction grating after passing through the diaphragm, then, the diffracted light is received, therefore, two-dimensional data of the whole subject can be acquired. However, as all the light from the all regions of the subject is diffracted by the same diffraction grating at the same time, obtained spectrum data will be data in which spectra of respective regions of the subject are mixed.

Accordingly, it is difficult to determine the spectrum at an arbitrary region on the subject. It is necessary to prevent the mixing of spectra of other regions by allowing spot irradiation of light only with respect to the region on the subject where the spectrum data is desired to be acquired as described above.

By contrast, it is necessary to illuminate all the regions of the subject when image data of the whole subject is acquired, therefore, two configurations of the spot irradiation of illumination light and the whole-region irradiation of illumination light are necessary, which increases costs.

Furthermore, the diffraction grating and the imaging unit are configured as different components in the above Patent Documents 1 and 2, therefore, there is a limit in positioning accuracy between the diffraction grating and the imaging unit and measurement errors are liable to occur. As the diffraction grating and the imaging unit are structurally placed apart from each other, it is difficult to avoid displacement due to variation over time even when calibration is performed at the time of assembling the device.

In view of the above, it is desirable to provide an optical device capable of accurately acquiring both of an image of a subject and spectrum data at an arbitrary region of the subject with simple structure.

An embodiment of the present disclosure is directed to an optical device including an image-forming optical system forming an image of light from a subject, an imaging unit receiving light of the image formed by the image-forming optical system, a reflection spectroscopic device covering a given area in an imaging area of the imaging unit and a spectrum detection unit detecting a spectroscopic spectrum of light reflected by the reflection spectroscopic device.

According to the embodiments of the present disclosure, the reflection spectroscopic device covers the given area in the imaging area receiving light from the subject. Therefore, it is possible to take out the light only from a specific region of the subject corresponding to the given area covered by the reflection spectroscopic device after reflection and to separate the light. Light from other regions is directly received by the imaging unit.

Additionally, the reflection spectroscopic device is arranged so as to cover the imaging area, therefore, the imaging unit and the reflection spectroscopic device can be integrally formed.

According to the embodiment of the present disclosure, light only from the specific region of the subject corresponding to the area covered by the reflection spectroscopic device is taken out on the imaging area of the imaging unit and the light is separated. Light from other regions is received by the imaging unit. Therefore, the image of the whole subject and the spectrum at the arbitrary region of the subject can be acquired with high accuracy.

Additionally, the reflection spectroscopic device is arranged so as to cover the imaging area to thereby integrally form the imaging unit and the reflection spectroscopic device, which can improve positional accuracy.

DETAILED DESCRIPTION

Hereinafter, embodiments of the present disclosure will be explained but the present disclosure is not limited to the following embodiments. The explanation will be made in the following order.

1. First Embodiment (example in which a waveguide unit, an imaging unit and a spectrum detection unit are integrated)
2. Second Embodiment (example in which the imaging unit and the spectrum detection unit are separately arranged)
3. Third Embodiment (example of being used for an electronic apparatus such as a camera)

1. First Embodiment

Figure 1:
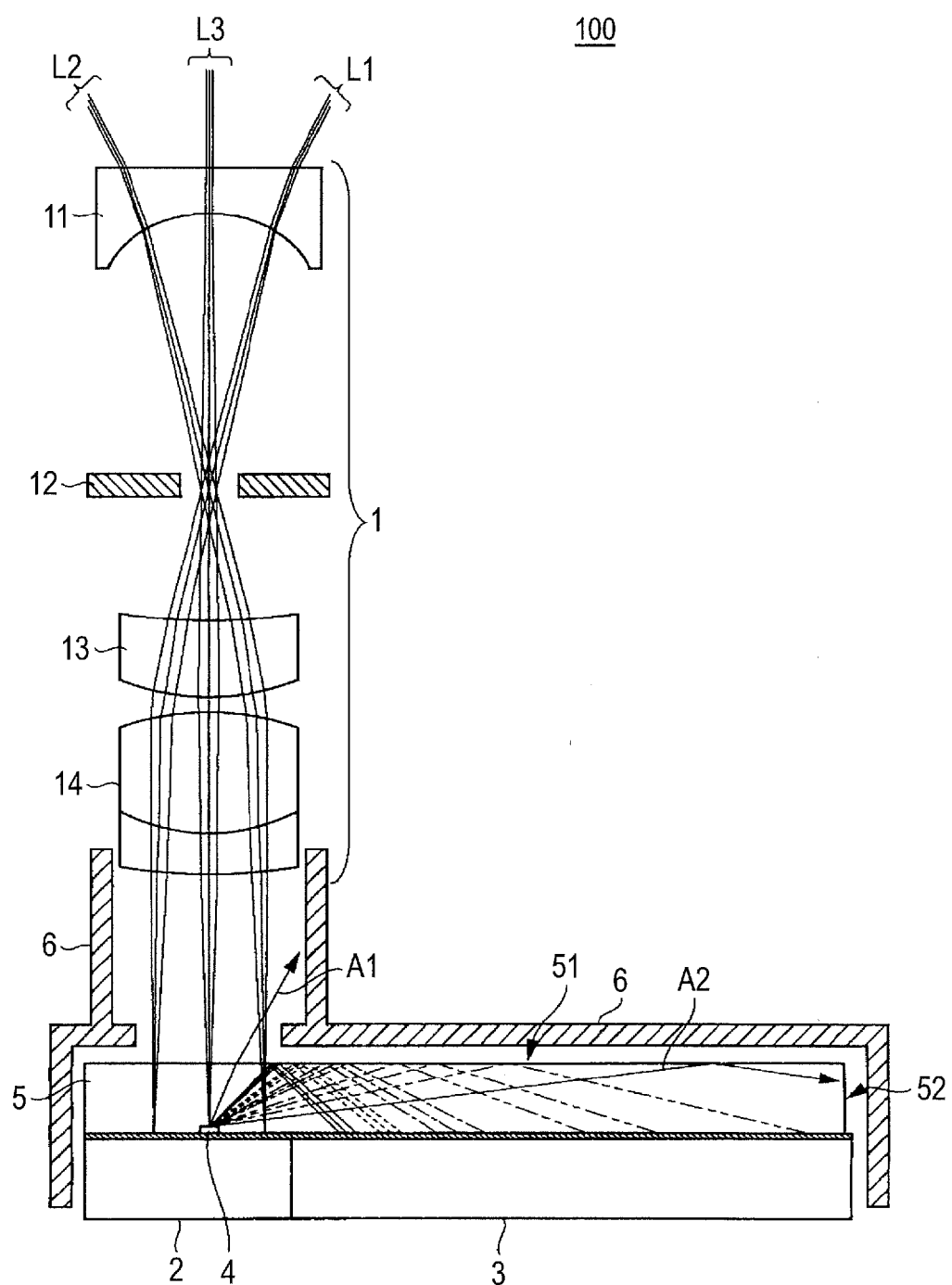
FIG. 1 is a schematic structural view of an optical device according to a first embodiment of the present disclosure.

Example in which a Waveguide Unit, an Imaging Unit and a Spectrum Detection Unit are Integrated FIG. 1 is a schematic structural view showing a structure of an optical device 100 according to a first embodiment. The optical device 100 includes an image-forming optical system 1 forming an image of light from a subject, an imaging unit 2 receiving light of the image formed by the image-forming optical system 1 and a reflection spectroscopic device 4 arranged so as to cover a given area in an imaging area of the imaging unit 2.

Light from the subject forms an image on the imaging area of the imaging unit 2 by the image-forming optical system 1. In this case, the image-forming optical system 1 is configured by including a first lens 11 having negative refractive power with a flat concave shape, a second lens 13 having positive refractive power with a meniscus shape, a third lens 14 which is a combined lens having positive refractive power and a diaphragm 12.

The structure of the image-forming optical system 1 is not particularly limited as long as light from the subject forms an image on the imaging area of the imaging unit 2. It is preferable that F-number of the image-forming optical system 1 can be changed by using an adjustable diaphragm as the diaphragm 12.

For example, light ray groups L1 and L2 from the subject collected by the image-forming optical system 1 are transmitted through a waveguide unit 5 arranged on the imaging unit 2 and the spectrum detection unit 3 and form an image on the imaging area of the imaging unit 2. A two-dimensional image of the subject is acquired in this manner.

The reflection spectroscopic device 4 is arranged so as to cover an arbitrary area on the imaging area of the imaging unit 2. The reflection spectroscopic device 4 can be arranged so as to touch the surface of the imaging unit 2 or can be integrally formed on the surface of the imaging unit 2. It is also preferable that the reflection spectroscopic device 4 is apart from the surface of the imaging unit 2 as described later. As the reflection spectroscopic device 4, for example, a reflection diffraction grating, a hologram device, a prism and the like can be used.

Light incident on the reflection spectroscopic device 4 in light from the subject collected by the image-forming optical system 1 is reflected, for example, as shown by a light ray group L3 as well as separated and travels through the waveguide unit 5. The light reflected by the reflection spectroscopic device 4 is totally reflected by a face 51 of the waveguide unit 5 on the side of the image-forming optical system 1 to thereby be guided to a detection area of the spectrum detection unit 3 and received there. A spectrum of the subject is detected in this manner.

Particularly in the embodiment, light in shorter wavelengths than a necessary spectrum wavelength range is transmitted as shown by an arrow A1 without being reflected on the face 51 of the waveguide unit 5. Light in longer wavelengths than the necessary spectrum wavelength range is totally reflected on the face 51 of the waveguide unit 5 as shown by an arrow A2, then, transmitted through a side face 52 of the waveguide unit 5 and emitted outside the waveguide unit 5.

An incident angle $\Theta$ of light having a wavelength $\lambda$ satisfying a total reflection condition with respect to the face 51 of the waveguide unit 5 is determined by the following expression (1).

$$\sin \Theta = N^{\lambda'}/N^{\lambda} \qquad (1)$$

$N^{\lambda}$: refractive index of the waveguide unit 5 with respect to light having the wavelength $\lambda$ $N^{\lambda'}$: refractive index at the outside of the waveguide unit 5 with respect to light having the wavelength $\lambda$ For example, when glass having a refractive index of approximately 1.5 is used for the waveguide unit 5, the angle at which light in the shortest wavelength in a desired wavelength range is incident on the face 51 is allowed to be larger than 41.81 degrees. As wavelength components shorter than the wavelength does not satisfy the total reflection condition, such light is outputted outside the waveguide unit 5. As light in unnecessary wavelengths is not propagated through the waveguide unit 5, noise is suppressed in the spectrum detection unit 3.

It is also possible to allow light from the reflection spectroscopic device 4 to be reflected by performing mirror processing on the upper surface of the waveguide unit 5. However, light absorption occurs in no small measure in the mirror processing, whereas, 100 percent of light is reflected in the total reflection conceptually, therefore, utilization efficiency of light is high. Additionally, when the mirror processing is performed in an effective area of the image-forming system, all or part of light is reflected there. Therefore, imaging in the imaging unit 2 is interrupted when an effective diameter of the lens is large, however, in the case where light is reflected by the total reflection, all the light incident on the waveguide unit 5 from the image-forming optical system 1 can be transmitted, therefore, such constraints can be circumvented.

It is preferable that a light absorber is provided on the side face 52 of the waveguide unit 5 by, for example, applying black painting and so on. It is possible to prevent reflection of light by the side face 52 as well as prevent light emitted outside the waveguide 5 from re-entering the waveguide unit 5 as stray light and forming an image on the imaging unit 2, which can prevent ghosting.

It is desirable to provide a light shielding unit 6 for covering the imaging unit 2, the spectrum detection unit 3 and the waveguide unit 5 to thereby shield unnecessary light from the outside. It is also possible to prevent ghosting due to light shown by the arrows A1, A2 and the like by providing the light absorber on an inner surface of the light shielding unit 6 in the same manner.

Figure 2:
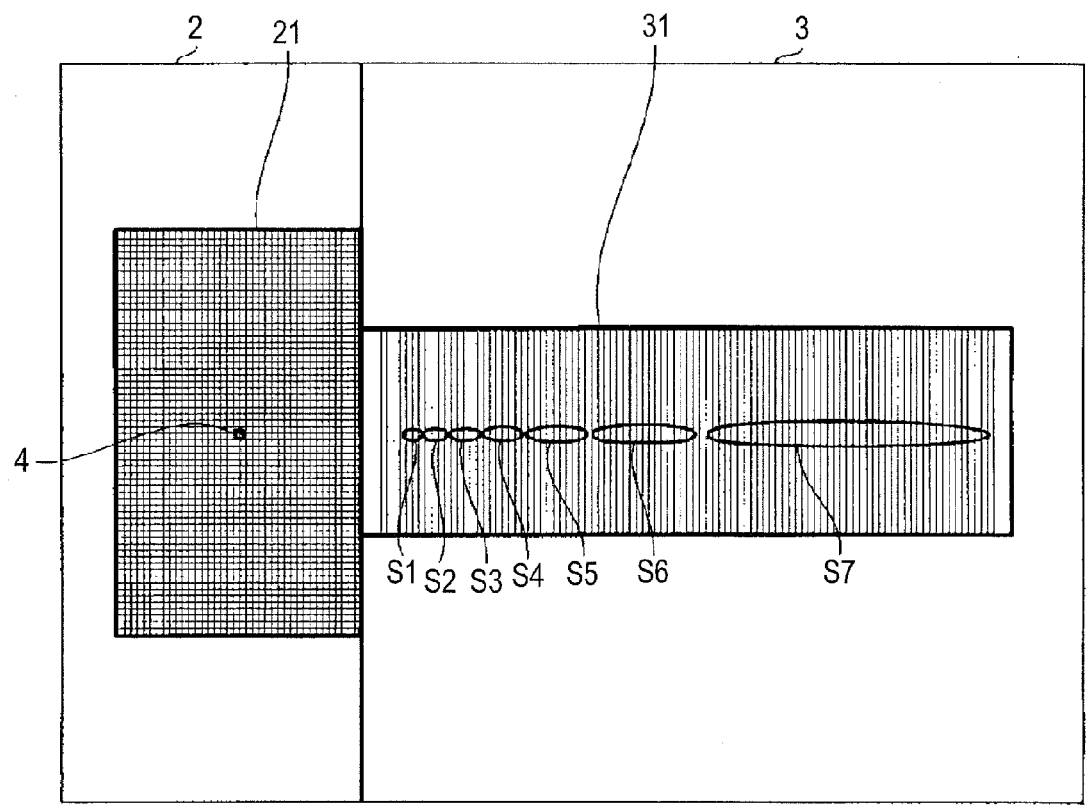
FIG. 2 is a schematic upper surface view showing a reflection spectroscopic device, an imaging unit and a spectrum detection unit.

FIG. 2 is a schematic upper surface view of the imaging unit 2 and the spectrum detection unit 3 seen from the above. The imaging unit 2 and the spectrum detection unit 3 are integrally formed and an imaging area 21 and a spectrum detection area 31 are arranged on the same substrate in the present embodiment.

In the case where the imaging unit 2 and the spectrum detection unit 3 are integrally formed as described above, the waveguide unit 5 can be also formed on the imaging unit 2 and the spectrum detection unit 3 integrally, therefore, the device can be further downsized.

In the imaging area 21, plural photoelectric conversion elements are two-dimensionally arranged in a matrix state, for example. In the spectrum detection area 31, plural photoelectric conversion elements are one-dimensionally arranged.

The reflection spectroscopic device 4 is arranged in the center of the imaging area 2, for example. Light incident on the reflection spectroscopic device 4 is reflected and separated, reaching the spectrum detection area 31 after totally reflected on a not-shown upper surface of the waveguide unit 5. Here, spots S1 to S7 formed by light in a wavelength range of 620 nm to 860 nm in increments of 40 nm on the spectrum detection unit 31 are schematically shown. In fact, light in continuous wavelengths of 620 nm to 860 nm is incident on the spectrum detection area 31.

In the spectrum detection area 31, the photoelectric conversion devices are arranged one dimensionally at equal intervals and having the same size. Accordingly, for example, when light intensity in the vicinity of the wavelength 860 nm shown by the spot S7 is desired to be detected, outputs of the photoelectric conversion devices under the area where the spot S7 is formed are integrated to thereby detect a spectrum.

Figure 3:
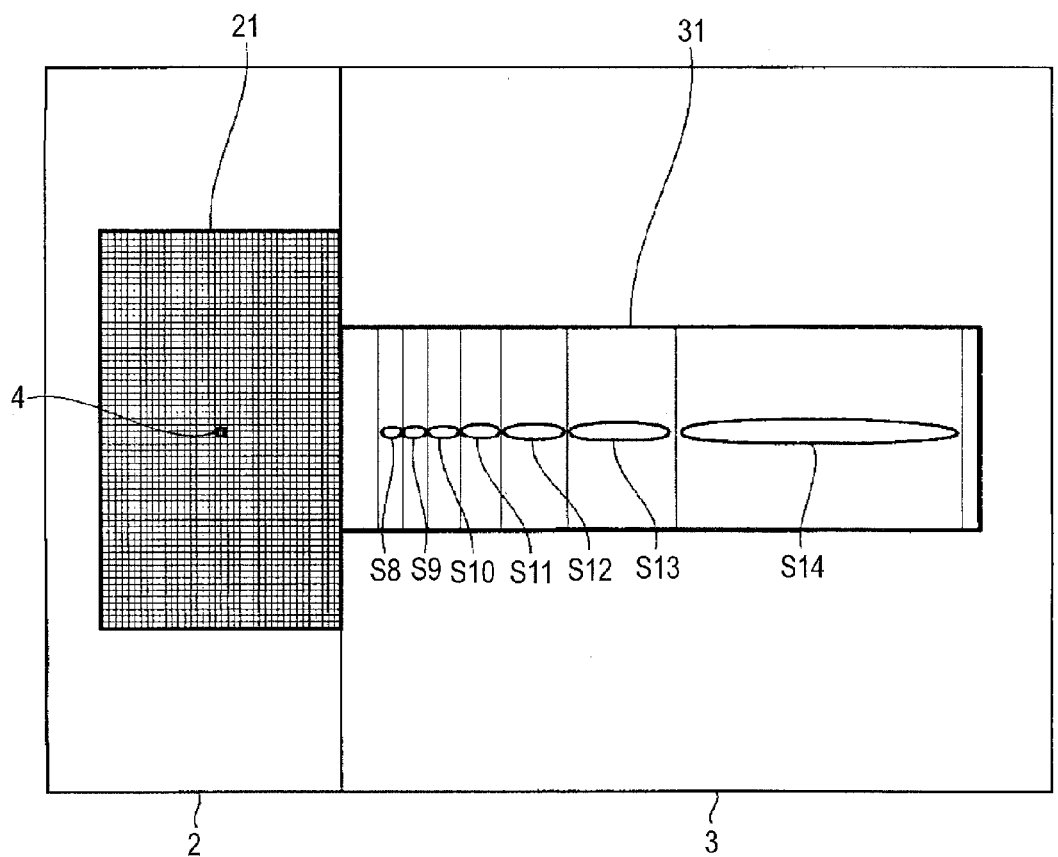
FIG. 3 is a schematic upper surface view showing the imaging unit and the spectrum detection unit.

It is not always necessary that the photoelectric conversion devices arranged in the spectrum detection area 31 are arranged at equal intervals and it is also preferable that, for example, the photoelectric conversion devices are arranged in sizes slightly different with one another as shown in FIG. 3. In the example of FIG. 3, the size of the photoelectric conversion devices varies according to the size of spots formed by light in the wavelength range of 620 nm to 860 nm in increments of 40 nm.

Figure 4:
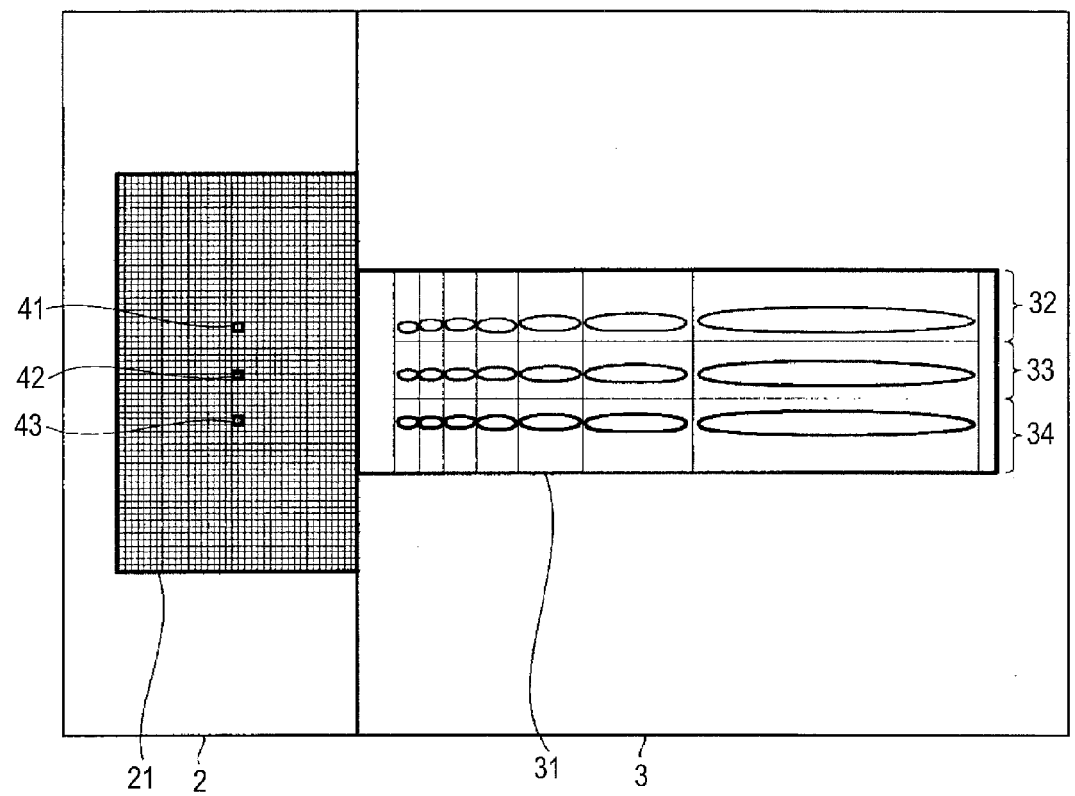
FIG. 4 is a schematic upper surface view showing a structure of the imaging unit and the spectrum detection unit in the case where three reflection spectroscopic devices are provided on an imaging area of the imaging unit.

It is also preferable that plural reflection spectroscopic devices can be arranged on the imaging area 21 as shown in FIG. 4. Three reflection spectroscopic devices 41, 42 and 43 are arranged on the imaging area 21 of the imaging unit 2.

In the spectrum detection area 31 of the spectrum detection unit 3, three rows of photoelectric conversion device groups 32, 33 and 34 are one-dimensionally arranged so as to correspond to three reflection spectroscopic devices 41, 42 and 43. Light reflected and separated by the reflection spectroscopic devices 41, 42 and 43 are received respectively by the photoelectric conversion device groups 32, 33 and 34, forming spots, for example, as shown in the drawing.

Here, the example in which the size of photoelectric conversion devices is changed according to the size of spots to be formed, however, it is also preferable that photoelectric conversion devices having the same size are arranged at equal intervals.

Figure 5:
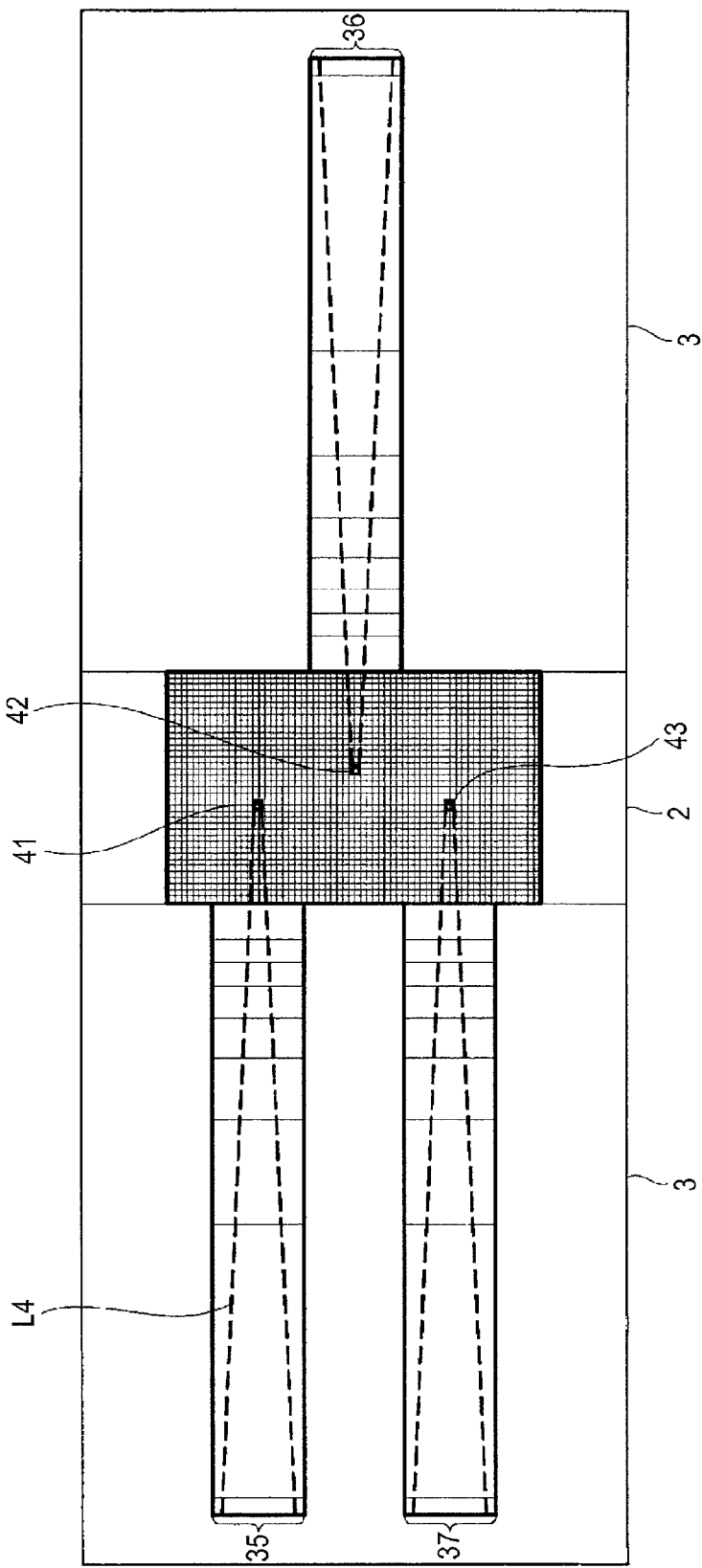
FIG. 5 is a schematic upper surface view showing a structure of the imaging unit and the spectrum detection unit in the case where three reflection spectroscopic devices are provided on the imaging area of the imaging unit.

In FIG. 5, the spectrum detection area receiving light reflected and separated by the three reflection spectroscopic devices 41, 42 and 43 arranged on the imaging area 21 is disposed by being separated to three areas.

Spectrum detection areas 35 and 37 receiving light from the reflection spectroscopic devices 41 and 43 are arranged on the same side with respect to the imaging area 21. On the other hand, a spectrum detection area 36 receiving light from the reflection spectroscopic device 42 arranged between the reflection spectroscopic devices 41 and 43 is arranged on the opposite side to the spectrum detection areas 35 and 37 with respect to the imaging area 21.

As described above, plural spectrum detection areas can be respectively arranged on the opposite sides alternately in the imaging area. According to the arrangement, the distance between adjacent spectrum detection areas 35 and 37 can be increased. Therefore, for example, even when light reflected and separated by the reflection spectroscopic device 41 spreads as shown by a broken line L4, it is possible to prevent the light from entering the adjacent spectrum detection area 37. It is also possible to prevent reflection lights from the adjacent reflection spectroscopic devices 41 and 42 from overlapping each other.

Figure 6:
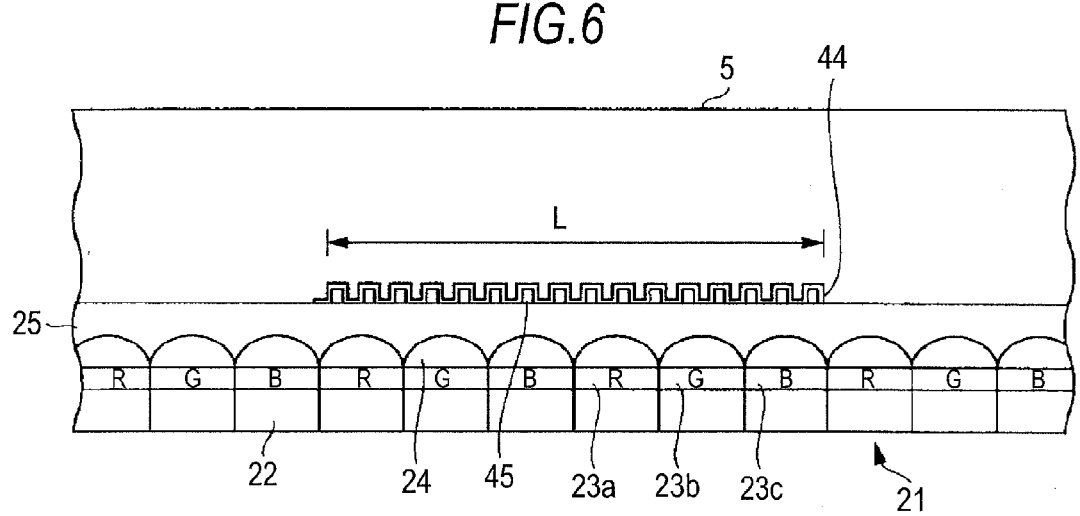
FIG. 6 is a schematic cross-sectional view showing the imaging area of the imaging unit, the reflection spectroscopic device and a waveguide unit.

FIG. 6 shows a schematic cross-sectional view of the imaging area 21 of the imaging unit 2, the waveguide unit 5 and the reflection spectroscopic device 4.

In the imaging area 21 of the imaging unit 2, photoelectric conversion devices 22 such as a Si photodiode and so on generating electric signals corresponding to the light receiving amount are two-dimensionally arranged. On the photoelectric conversion devices 22, for example, color filters 23a, 23b and 23c of RGB are respectively arranged.

Condenser lenses 24 collecting light to the photoelectric conversion devices 22 are also formed on the color filters 23a, 23b and 23c. The structure of the imaging area 21 is not particularly limited and various forms used for known imaging devices can be used. It is also preferable that, for example, InGaAs-series photodiodes are arranged together as the photoelectric conversion devices to thereby receive infrared light.

A cover layer 25 covering the condenser lenses 24 to be a junction layer with respect to the waveguide unit 5 is arranged over the condenser lenses 24. The cover layer 25 is made of, for example glass, resin and so on. The arrangement of the cover layer 25 planarizes a concavo-convex shape due to the condenser lenses 24 and the waveguide unit 5 can be arranged closely on the imaging area 21 without interposition of an air layer.

The waveguide unit 5 is disposed over the cover layer 25 so as to touch the surface of the cover layer 25. A material for the waveguide unit 5 is selected in consideration of sufficient transmittance with respect to light in wavelengths to be measured and a refractive index necessary for total reflection of light. For example, glass, resin and so on can be used.

For example, a reflection diffraction grating 44 is formed on the surface of the waveguide unit 5 on the side touching the imaging area 21 as the reflection spectroscopic device 4. The concavo-convex shape of the diffraction grating can be formed simultaneously at the time of forming the waveguide unit 5 as well as can be formed by cutting. The reflection diffraction grating 44 is formed by coating, for example, Al and the like on the surface of the concavo-convex shape. When the reflection spectroscopic device 4 is integrally formed on the surface of the waveguide 5 as described above, accuracy variation with time after assembling can be improved as well as the number of components can be reduced to thereby realize miniaturization of the device.

The surface height of convex portions of the reflection diffraction grating 44 is the same as or lower than the surface of the waveguide unit 5. Accordingly, the waveguide unit 5 can be closely arranged to the imaging unit 2 and the spectrum detection unit 3 (not shown) so as to touch the surfaces thereof. Therefore, the imaging unit 2, the spectrum detection unit 3 and the waveguide 5 can be integrally arranged, which realizes a more compact structure.

The area of a portion where the reflection diffraction grating 44 is arranged is not particularly limited as long as the light amount necessary for detecting a spectrum in the spectrum detection unit 3 can be reflected. For example, when a length L of the portion where the reflection diffraction grating 44 is arranged has a length at least longer than wavelengths of light to be measured, light can be diffracted.

Figure 7:
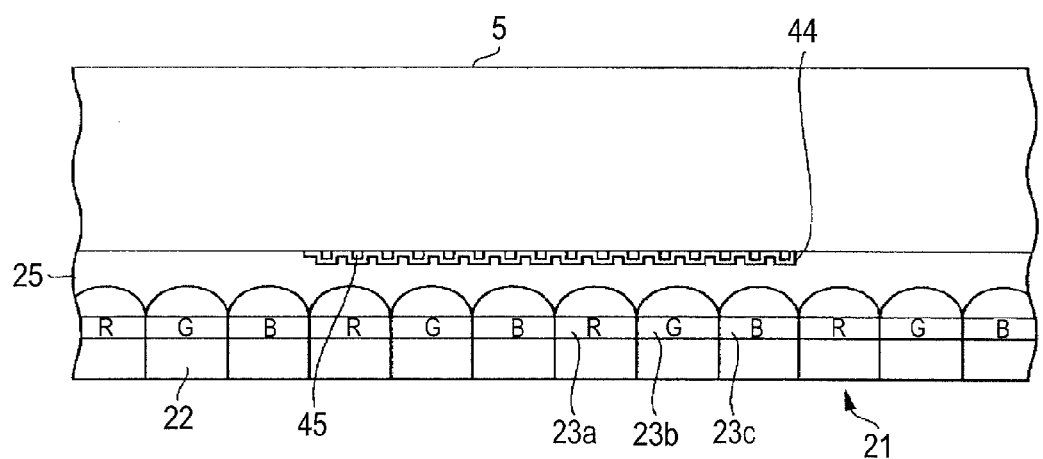
FIG. 7 is a schematic cross-sectional view showing the imaging area of the imaging unit, the reflection spectroscopic device and the waveguide unit.

It is also preferable that the reflection diffraction grating 44 is integrally formed on the surface of the cover layer 25 of the imaging area 21 as shown in FIG. 7. In this case, the waveguide unit 5 and the cover layer 25 are arranged closely by allowing the surface height of convex portions of the reflection diffraction grating 44 to correspond to the surface height of the cover layer 25.

As shown in FIG. 6 and FIG. 7, an air layer 45 is interposed between the waveguide unit 5 and the cover layer 25 at a position where the reflection diffraction grating 44 is arranged. However, in the case where the reflection diffraction grating 44 is formed on the surface of the waveguide unit 5 as shown in FIG. 6, light is reflected by the reflection coating made of Al and the like on the surface of the reflection diffraction grating 44 without passing through the air layer 45.

In the case where the reflection diffraction grating 44 is provided on the surface of the cover layer 25 as shown in FIG. 7, the air layer 45 is buried with the same material as the waveguide unit 5 such as resin, glass or the like, and reflection or scattering is suppressed at the interface thereof.

Figure 8:
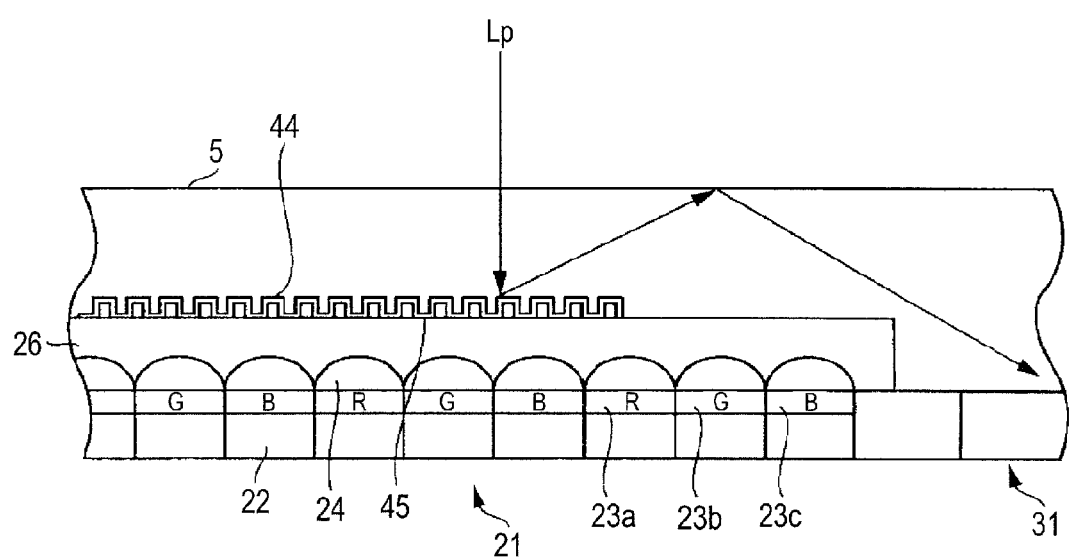
FIG. 8 is a schematic cross-sectional view showing the imaging area of the imaging unit, the reflection spectroscopic device and the waveguide unit.

It is not always necessary that the reflection spectroscopic device such as the reflection diffraction grating 44 touch the imaging unit 2. For example, FIG. 8 shows an example in which an air layer 26 is provided between the imaging area 21 and the reflection diffraction grating 44 (waveguide unit 5) without providing the cover layer 25 in FIG. 6.

In this case, the air layer 26 is arranged between the waveguide unit 5 and the imaging area 21 by providing a notch portion in the waveguide unit 5 over the imaging area 21. The reflection diffraction grating 44 is formed at the notch portion on the surface of the waveguide unit 5.

It is preferable that the air layer 26 is not provided on the spectrum detection area 31. Light reaching the spectrum detection area 31 is totally reflected on the upper surface of the waveguide unit 5 as shown by a light path Lp and is incident on a lower surface of the waveguide unit 5 while satisfying the total reflection condition. Therefore, if there is the air layer between the waveguide unit 5 and the spectrum detection area 31, light is totally reflected also on a boundary between the waveguide unit 5 and the air layer, as a result, it is difficult to allow the light to be incident on the spectrum detection area 31.

As described above, it is not always necessary that the reflection diffraction grating 44 touches the imaging unit 2, however, if the reflection diffraction grating 44 is positioned far from the imaging unit 2, light from regions other than the region on the subject where the spectrum is desired to be acquired is also incident on the reflection diffraction grating 44. Therefore, it is desirable that the reflection diffraction grating 44 is disposed at a position where light flux is converged to some degree, however, the arrangement position can be appropriately fixed between the image-forming optical system 1 and the imaging unit 2 in accordance with the structure of the image-forming optical system 1 and the desired accuracy of in spectrum detection.

For example, the distance between the reflection diffraction grating 44 and the imaging unit 2 is preferably arranged at a position within 200 times of the focal depth of the image-forming optical system 1. In this case, when F-number of the image-forming optical system 1 is 2.8 and the size of the photoelectric device 22 is 1 µm, the distance between the reflection diffraction grating 44 and the imaging unit 2 will be 1 mm or less. When the distance between the reflection diffraction grating 44 and the imaging unit 2 is at least 5 mm or less, design flexibility of the image-forming optical system 1 which allows only the light from a particular region of the subject to be incident on the reflection diffraction grating 44.

In this case, a laminar-type diffraction grating having rectangular grooves is shown as the reflection diffraction grating 44, however, other types of gratings can be used according to wavelengths of light to be measured.

For example, a blazed holographic grating having sawtooth grooves is used as the reflection diffraction grating with respect to specific wavelengths from the ultraviolet range to the visible range, thereby obtaining high diffraction efficiency. Additionally, a holographic grating having sinusoidal grooves can be used as the reflection diffraction grating with respect to light in a wide wavelength range or in the near-infrared range. When there are restrictions in manufacture, the reflection diffraction grating can be formed in a step structure approximated to the above curved shape or the inclined shape.

It is also preferable to use the prism or the hologram device as the reflection spectroscopic device, in addition to the above reflection diffraction gratings.

For example, when the laminar-type reflection diffraction grating is used, the relation between an incident angle $\alpha$ and a diffraction angle $\beta$ of light is uniquely determined by the following expression 2 when a diffraction grating cycle (grating pitch), a wavelength of light and a diffraction order are determined.

$$n(\sin \alpha \pm \sin \beta) = Nm\lambda \qquad (2)$$

N: the number of slits (number of grooves) per 1 mm=1/ (diffraction grating cycle)

m: diffraction order (m=0, ±1, ±2, . . . )

λ: wavelength of light n: refractive index of a medium

Table 1 shows diffraction angles with respect to light in wavelengths of 400 nm to 900 nm when the incident angle α was 0 degree in the case where borosilicate crown glass (BK7) was used for a glass material of the waveguide unit 5 and that the diffraction grating cycles were 500 nm, 600 nm, 620 nm and 700 nm in the structures shown in FIG. 1 to FIG. 6. The diffraction angles were found with respect to light in the first diffraction order. Critical angles at which the total reflection occurs in the waveguide unit 5 with respect to light in respective wavelengths are also shown.

TABLE 1

| Wavelength | Total reflection angle of respective wavelengths | Diffraction grating pitch | | | |
|---|---|---|---|---|---|
| | | 500 | 600 | 620 | 700 |
| 400 | 40.79 | 31.51 | 25.82 | 24.93 | 21.92 |
| 450 | 40.97 | 36.16 | 29.45 | 28.41 | 24.93 |
| 500 | 41.09 | 41.09 | 33.21 | 32.01 | 28.00 |
| 550 | 41.19 | 46.42 | 37.13 | 35.75 | 31.16 |
| 600 | 41.26 | 52.32 | 41.26 | 39.66 | 34.42 |
| 620 | 41.29 | 54.90 | 42.99 | 41.29 | 35.76 |
| 660 | 41.33 | 60.66 | 46.59 | 44.67 | 38.51 |
| 700 | 41.37 | 67.71 | 50.45 | 48.26 | 41.37 |
| 740 | 41.40 | 78.18 | 54.65 | 52.12 | 44.36 |
| 780 | 41.43 | — | 59.35 | 56.36 | 47.51 |
| 820 | 41.46 | — | 64.80 | 62.12 | 50.86 |
| 860 | 41.48 | — | 71.70 | 66.75 | 54.47 |
| 900 | 41.51 | — | 83.74 | 74.15 | 58.43 |
| 940 | 41.53 | — | — | — | 62.91 |
| 980 | 41.55 | — | — | — | 68.20 |
| 1020 | 41.57 | — | — | — | 75.19 |

For example, when the incident angle α is 0 degree and the diffraction grating cycle is 500 nm, the diffraction angle of the first-order light with respect to light having a wavelength of 500 nm is approximately 41.09 degrees, which is almost equivalent to the critical angle. Therefore, light in wavelengths shorter than 500 nm is emitted outside the waveguide unit 5 and light in wavelengths of 500 nm or more is propagated through the waveguide after the total reflection to reach the spectrum detection unit 3.

On the other hand, when the diffraction grating cycle is 600 nm, the diffraction angle of the first-order light with respect to light having a wavelength of 600 nm is approximately 41.26 degrees, which is almost equivalent to the critical angle. Therefore, light in wavelengths shorter than 600 nm is emitted outside the waveguide unit 5 and light in wavelengths of 600 nm or more is propagated through the waveguide.

When the diffraction grating cycle is 700 nm, the diffraction angle of the first-order light with respect to light having a wavelength of 700 nm is approximately 41.37 degrees, which is almost equivalent to the critical angle of the waveguide unit 5 with respect to light having the wavelength 700 nm. Therefore, light in wavelengths shorter than 700 nm is emitted outside the waveguide unit 5 and light in wavelengths of 700 nm or more is propagated through the waveguide 5.

It is possible to inhibit unnecessary light in shorter wavelengths from propagating through the waveguide unit 5 and reaching the spectrum detection unit 3 by changing the diffraction grating cycle of the reflection diffraction grating and adjusting the diffraction angle with respect to light in respective wavelength.

For example, when a spectrum of light in wavelengths of 620 nm or more is desired to be detected as shown in FIG. 2, the diffraction grating cycle of the reflection diffraction grating is preferably set to 620 nm. Accordingly, light in wavelengths of 500 nm to 620 nm is emitted outside the waveguide unit 5 and light in wavelengths of 620 nm to 900 nm is propagated through the waveguide unit 5 and reaches the spectrum detection unit 3.

Table 2 shows distances (hereinafter, referred to as reach distances) of light from the reflection spectroscopic device 4 to positions on the spectrum detection area 31, which has been reflected by the reflection spectroscopic device 4 and reached the spectrum detection area 31 through the waveguide unit 5 as shown in FIG. 2. The reflection diffraction grating having the diffraction grating cycle of 600 nm was used as the reflection spectroscopic device 4, and distances obtained when thicknesses of the waveguide portion 5 were 0.95 mm, 1 mm and 1.05 mm were calculated with respect to respective wavelengths of light.

TABLE 2

| | Thickness of waveguide | | |
|---|---|---|---|
| wavelength | 0.95 mm | 1 mm | 1.05 mm |
| 400 | 0.91 | 0.96 | 1.01 |
| 450 | 1.07 | 1.12 | 1.18 |
| 500 | 1.24 | 1.30 | 1.37 |
| 550 | 1.43 | 1.51 | 1.59 |
| 600 | 1.66 | 1.75 | 1.84 |
| 620 | 1.77 | 1.86 | 1.95 |
| 660 | 2.00 | 2.11 | 2.21 |
| 700 | 2.30 | 2.42 | 2.54 |
| 740 | 2.67 | 2.81 | 2.96 |
| 780 | 3.20 | 3.37 | 3.54 |
| 820 | 4.03 | 4.25 | 4.46 |
| 860 | 5.74 | 6.04 | 6.35 |
| 900 | 17.32 | 18.23 | 19.14 |
| 940 | — | — | — |
| 980 | — | — | — |
| 1020 | — | — | — |

For example, when the reflection spectroscopic device 4 is arranged in the center of the imaging area 21 and a width W1 of the imaging area 21 is 3.6 mm, it is necessary that the reach distance is 1.8 mm or more in order to allow the light reflected by the reflection spectroscopic device 4 reaches the spectrum detection area 31.

When the thickness of the waveguide 5 is 0.95 mm, the reach distance of light having a wavelength of 620 nm is 1.77 mm. As the light having the wavelength of 620 nm does not reach the spectrum detection area 31, it is difficult to detect the spectrum. When such light reaches the imaging area 21, the light is detected as noise.

On the other hand, when the thickness of the waveguide unit 5 is 1 mm, the reach distance of light having the wavelength of 620 nm is 1.86 mm, therefore, the light having the wavelength of 620 nm can be guided to the spectrum detection area 31. Therefore, it is preferable that the thickness of the waveguide unit 5 is set to 1 mm or more for detecting the spectrum of the light having the wavelength of 620 nm.

Moreover, the reach distance of unnecessary light in longer wavelengths is calculated, and the thickness of the waveguide unit 5 is determined so that the light does not reach the spectrum detection area 31 and guided to, for example, to the face 52 (refer to FIG. 1) of the waveguide unit 5. The processing of performing black paining or the like is applied to the face 52 to thereby absorb light in the longer wavelengths reaching the face 52.

Though the imaging unit 2 is arranged so that the light receiving surface thereof is vertical to an optical axis of the image-forming optical system 1 in this case, it is also preferable that the imaging unit 2 is arranged so as to be inclined to the optical axis of the image-forming optical system 1. For example, the imaging unit 2 is arranged in the inclined manner to thereby change the incident angle of light to be incident on the reflection spectroscopic device 4 and to adjust the diffraction angle. Accordingly, light in arbitrary wavelengths can be totally reflected on or transmitted through the face 51 of the waveguide unit 5.

It is also possible to adjust the incident angle of light with respect to the face 51 and to set the reach distance of light as well as the wavelength of light necessary for the total reflection by forming at least part of the face 51 of the waveguide unit 5 so as to be inclined to the optical axis of the image-forming optical system 1.

As described above, the reflection spectroscopic device 4 is disposed on the imaging area of the imaging portion 2 in the optical device 100 according to the embodiment. As light forming an image on the imaging area where the reflection spectroscopic device 4 is not disposed is directly acquired as two-dimensional image data, an image of the whole subject can be obtained without performing recombination of data and so on as in the past.

Then, the spectrum is detected by taking out part of light forming an image on the imaging area by the reflection spectroscopic device 4. Therefore, the image of the subject as well as the spectrum of the subject can be acquired at the same time.

The reflection spectroscopic device 4 is arranged on the imaging area of the imaging unit 2, namely, on the image-forming surface of the image-forming optical system 1. Therefore, light incident on the reflection spectroscopic device 4 is only the light from a particular region of the subject corresponding to a place where the reflection spectroscopic device 4 is arranged. As described above, light from the whole subject is not mixed in the spectrum detection unit, therefore, the spectrum only in the specific region on the subject can be detected.

Additionally, it is also possible to detect the spectrum while checking images of the subject in real time as the image of the subject and the spectrum in the specific region on the subject can be simultaneously obtained.

For example, a case where the spectrum of a palm vein is detected will be explained with reference to schematic views of FIGS. 9A to 9C.

Figures 9A, 9B, 9C:
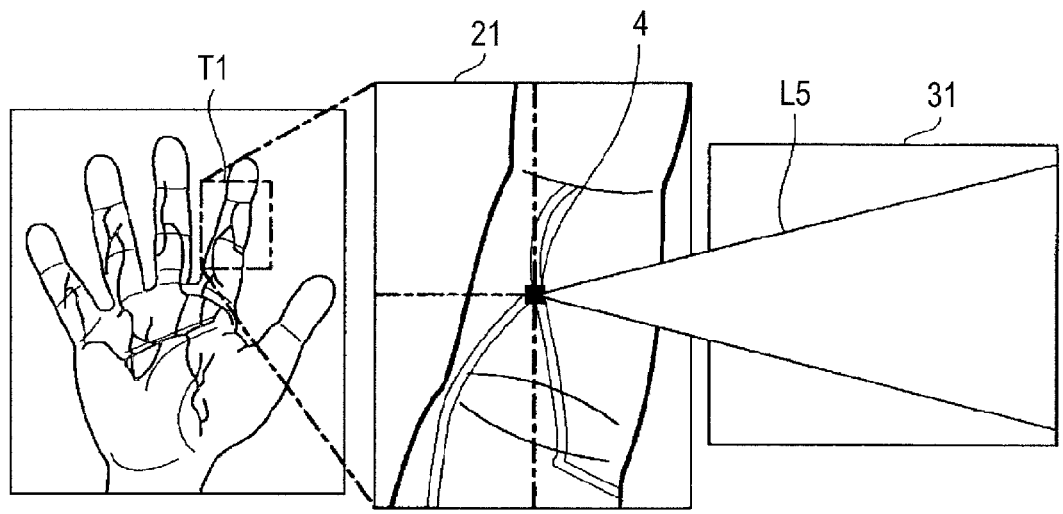
FIG. 9A is an explanatory view showing a subject.
FIG. 9B is an explanatory view showing an image of the subject formed on the imaging area of the imaging unit and FIG. 9C is an explanatory view showing a spectrum detection area receiving light reflected and separated by the reflection spectroscopic device.

In this case, an example in which a palm shown in FIG. 9A is imaged as a subject and a spectrum of a vein in a region T1 is detected is cited as an example. When the region T1 is imaged by the optical device 100 according to the embodiment, an image of a finger shown in FIG. 9B is formed on the imaging area 21 of the imaging unit 2 and an image is acquired.

In this case, the reflection spectroscopic device 4 is arranged in the center of the imaging area 21 and, for example, the center of the image is adjusted on the vein where the spectrum is desired to be obtained while viewing images (moving pictures) to be imaged in real time. Then, light from the vein is reflected by the reflection spectroscopic device 4 and propagated through the not-shown waveguide unit 5 after total reflection while being spread as shown by a light flux L5, then, received by the spectrum detection region 31 of the spectrum detection unit 3 as shown in FIG. 9C. The spectrum of the finger vein is detected in this manner.

In the case of performing measurement of a subject irradiating or reflecting a specific spectrum with respect to light in specific wavelengths to be irradiated, the subject can be irradiated by an LED light source having a narrow light-emitting wavelength interval.

It is further preferable that a while light source is provided regardless of specific wavelengths. When the dedicated light source is provided, stable image data and spectrum data can be acquired regardless of the surrounding environment.

The place where the reflection spectroscopic device 4 is arranged can be arbitrarily determined. For example, light from the target region for the spectrum detection is allowed to be incident on the arranged place of the reflection spectroscopic device 4 by adjusting the direction or the position of the optical device 100, thereby detecting the spectrum at the arbitrary region of the subject.

For example, an alignment mark or the like can be displayed in a display region of the image corresponding to the place where the reflection spectroscopic device 4 is arranged. The spectrum at the desired region can be easily detected by adjusting the direction or the position of the optical device 100 so that the alignment mark is disposed on the target region of the subject while viewing the taken image.

The photoelectric conversion device arranged just under the reflection spectroscopic device 4 will be an area where light is shielded by the reflection spectroscopic device 4. The subject is not displayed at a position corresponding to the area of the photoelectric conversion device in the acquired image. The display area where the subject is not displayed can be used as the alignment mark.

Furthermore, as the reflection spectroscopic device 4 is provided so as to touch the imaging unit 2, positional accuracy of the reflection spectroscopic device 4 at the time of manufacture can be easily improved and positional displacement with time can be suppressed.

In the case where the diffraction grating is arranged in the vicinity of Fourier surface of the optical system as in the past, the whole light flux is incident on the diffraction grating just after passing through the diaphragm, therefore, the size is increased. Whereas, in the present embodiment, it is sufficient that the reflection spectroscopic device 4 is arranged only at the place on the imaging area where the spectrum is acquired as the reflection spectroscopic device 4 is provided so as to touch the imaging unit 2. Therefore, the size of the reflection spectroscopic device 4 can be reduced and the device can be downsized.

It is also preferable that F-number of the image-forming optical system 1 is changed in accordance with the measurement environment by using an adjustable diaphragm as the diaphragm 12 (refer to FIG. 1). For example, light collected on certain one point on the reflection spectroscopic device 4 by the image-forming optical system 1 form a light cone including light rays L7, L8 and the like which are inclined to a main light ray L6 by degrees +Θ, −Θ as shown in a schematic view of FIG. 10. That is, the incident angle of light incident on the reflection spectroscopic device 4 varies though the light is collected on the same one point.

Figure 10:
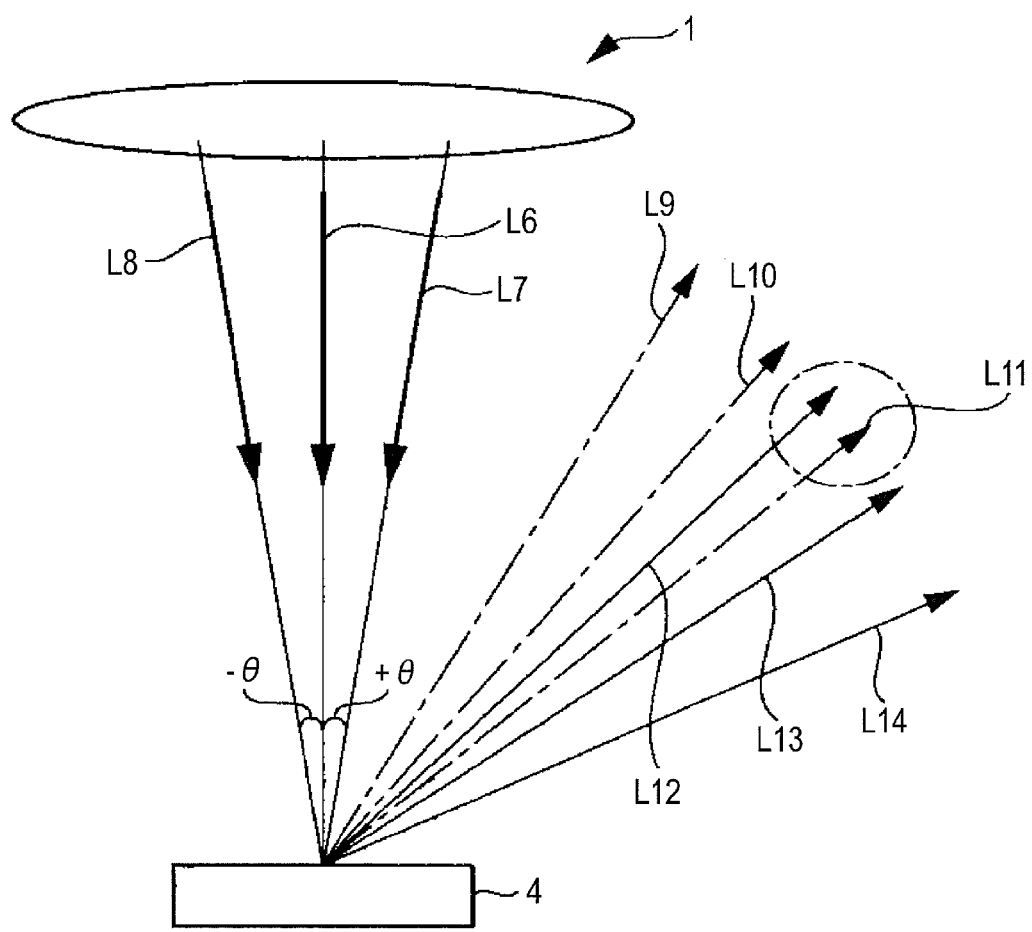
FIG. 10 is an explanatory view showing a state in which light having different wavelengths is separated and diffracted in the same direction.

For example, when the reflection spectroscopic device is the reflection diffraction grating, the diffraction direction will vary when the incident angle onto the reflection diffraction grating varies. In FIG. 10, for example, light having a wavelength of 700 nm is reflected at angles in the diffraction directions shown by light rays L9, L10 and L11, as well as light having a wavelength of 800 nm is reflected at angles in the diffraction directions shown by light rays L12, L13 and L14.

As light having the wavelength of 700 nm and light having the wavelength of 800 nm are mixed in the region T1, it is difficult to separate light accurately. As light in different wavelengths is received in the mixed state, crosstalk occurs in the spectrum detection between a signal with respect to light having the wavelength of 700 nm and the signal of light with respect to light having the wavelength of 800 nm.

Table 3 shows F-numbers of lenses as reference values and angles made by the outermost light ray and the main light ray in the light cone generated when parallel light is incident on the lens and collected.

TABLE 3

| Fno | Angle θ |
|---|---|
| 1 | 26.6 |
| 1.4 | 19.5 |
| 2.0 | 14.0 |
| 2.8 | 10.0 |
| 4.0 | 7.1 |
| 5.7 | 5.1 |
| 8.0 | 3.6 |
| 11.3 | 2.5 |
| 16.0 | 1.8 |
| 22.6 | 1.3 |
| 32.0 | 0.9 |

As can be seen from the above, the apex angle of the light cone by the image-forming optical system 1 becomes small as F-number is increased, therefore, the above-described crosstalk can be suppressed. However, when F-number is too large, the light intensity is reduced and the image becomes dark, therefore, it is difficult to identify the subject.

In response to the above, the adjustable diaphragm is used as the diaphragm 12 in the present embodiment, and F-number of the image-forming optical system 1 can be changed at the time of imaging of the subject and at the time of detecting the spectrum.

For example, the subject is imaged by reducing F-number of the image-forming optical system 1 to approximately 1.2 to 8, then, positioning is performed to the region on the subject where the spectrum is desired to be detected while checking obtained bright images in real time.

After completing the positioning, F-number of the image-forming optical system 1 is increased by narrowing the diaphragm 12 and the spectrum is detected, thereby performing accurate measurement while suppressing the crosstalk.

In this case, more accurate data can be acquired by extremely simple operation of adjusting the diaphragm, though the imaging and the spectrum detection are performed separately.

2. Second Embodiment

Example in which the Imaging Unit and the Spectrum Detection Unit are Separately Arranged In the first embodiment, the example in which the imaging unit and the spectrum detection unit are integrally formed is shown, however, these units can be arranged separately.

Figure 11:
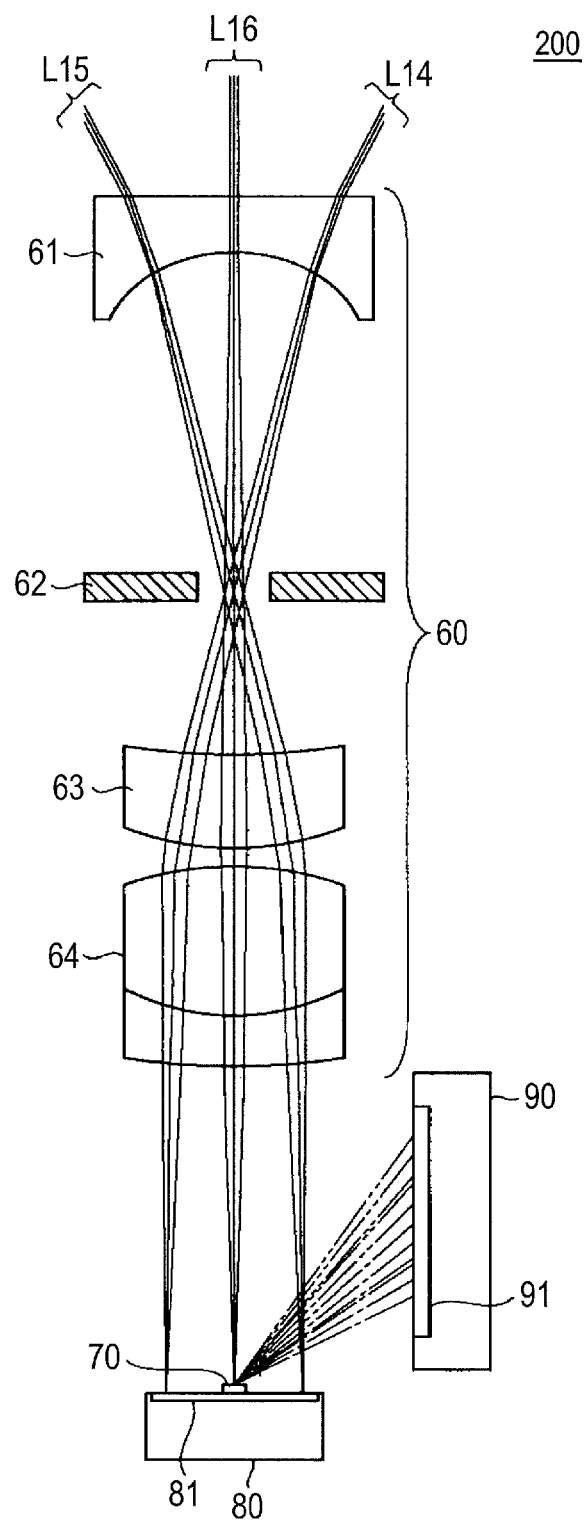
FIG. 11 is a schematic structural view showing an optical device according to a second embodiment of the present disclosure.

FIG. 11 is a schematic structural view of an optical device 200 according to a second embodiment. The optical device 200 according to the present embodiment includes an image-forming optical system 60 forming an image of light from a subject, an imaging unit 80 receiving light imaged by the image-forming optical system 60 and a reflection spectroscopic device 70 arranged so as to cover a given area in an imaging area of the imaging unit 80.

The structure of the image-forming optical system 60 is not particularly limited as long as light from the subject forms an image on the imaging area of the imaging unit 80 in the same manner as the first embodiment (refer to FIG. 1). In this case, the image-forming optical system 60 is configured by including a first lens 61 having negative refractive power with a flat concave shape, a second lens 63 having positive refractive power with a meniscus shape, a third lens 64 which is a combined lens having positive refractive power and a diaphragm 62.

The reflection spectroscopic device 70 is disposed at an arbitrary place on the imaging area of the imaging unit 80. The reflection spectroscopic device 70 can be arranged so as to touch the surface of the imaging unit 80 or can be formed integrally on the surface of the imaging unit 80. As the reflection spectroscopic device 70, for example, a reflection diffraction grating, a hologram device, a prism and the like can be used.

It is preferable that the reflection spectroscopic device 70 is integrally formed on the surface of the cover layer 25 covering photoelectric conversion devices of the imaging unit 80 as shown in FIG. 7 in the first embodiment, however, it does not matter whether the waveguide unit 5 is provided or not.

It is not always necessary that the reflection spectroscopic device 70 touches the surface of the imaging unit 80, and that an air layer or a layer made of a light-transmitting material is interposed therebetween in the same manner as the first embodiment.

For example, as shown by light ray groups L14 and L15, light from a subject forms an image on the imaging area of the imaging unit 80 by the image-forming optical system 60 to thereby acquire an image of the subject.

A light ray group L16 collected on the reflection spectroscopic device 70 arranged on the imaging area of the imaging unit 80 is reflected and separated by the reflection spectroscopic device 70, then, directly received by a spectrum detection unit 90.

Also in the optical device 200 according to the embodiment, the reflection spectroscopic device 70 is arranged so as to cover a given area of the imaging area of the imaging unit 80, and part of light forming the image on the imaging area is taken out to thereby detect a spectrum. Accordingly, the image of the subject as well as the spectrum of the subject can be acquired at the same time.

The reflection spectroscopic device 70 is arranged on the image-forming surface of the image-forming optical system 60. According to the structure, light to be incident on the reflection spectroscopic device 70 is only the light from a specific region of the subject corresponding to the place where the reflection spectroscopic device 70 is arranged. As light from the whole subject is not mixed in the spectrum detection unit, the spectrum only at the specific region on the subject can be detected.

In FIG. 11, the spectrum detection unit 90 is separately arranged so that a light receiving surface thereof is inclined to a light receiving surface of the imaging unit 80 in order to directly receive light reflected and separated by the reflection spectroscopic device 70. The imaging unit 80 and the spectrum detection unit 90 are individually formed and arranged in the above manner.

When the light reflected and separated by the reflection spectroscopic device 70 is directly received by the spectrum detection unit 90, costs can be reduced because the waveguide unit is not necessary.

The present embodiment can apply the same structure as the first embodiment (FIG. 1) except that the waveguide unit is omitted by allowing the spectrum detection unit 90 to directly receive light reflected and separated by the reflection spectroscopic device 70.

Therefore, it is preferable that, for example, the adjustable diaphragm is used as the diaphragm 62, thereby reducing F-number of the image-forming optical system 60 at the time of imaging the subject and increasing F-number of the image-forming optical system 60 at the time of detecting the spectrum. Accordingly, the subject can be checked with a bright image as well as the spectrum can be detected with high accuracy while suppressing crosstalk.

3. Third Embodiment

Example of being Used for an Electronic Apparatus Such as a Camera

Figure 12:
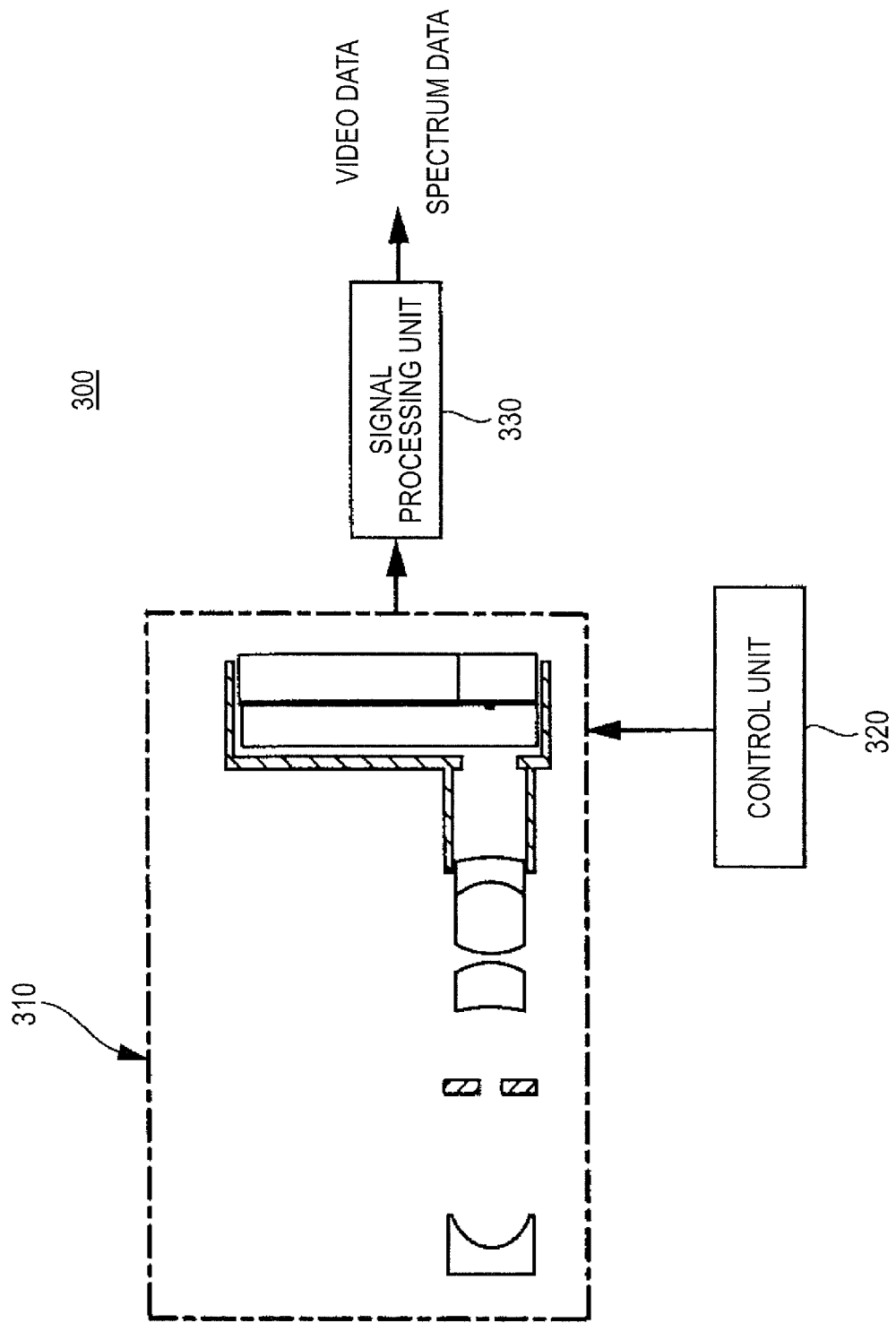
FIG. 12 is a schematic structural view showing an electronic apparatus according to a third embodiment of the present disclosure.

FIG. 12 shows an example in which the optical device according to the embodiment of the present disclosure is applied to an electronic apparatus such as a camera. As the electronic apparatus according to the embodiments, a camera capable of imaging still images or moving pictures is cited as an example.

An electronic apparatus 300 according to the present embodiment includes an optical device 310 receiving light from a subject, a control unit 320 controlling operations of the optical device 310 and a signal processing circuit 330 processing an output signal from the optical device 310.

Either of the optical devices 100 and 200 shown in the first embodiment (refer to FIG. 1) and in the second embodiment (refer to FIG. 11) is applied as the optical device 310.

The control unit 320 supplies a timing signal to, for example, the imaging unit and the spectrum detection unit in the optical device 310 to instruct them to perform transfer operation of acquired signals.

The signal processing circuit 330 performs signal processing such as correlated double sampling with respect to the output signal from the imaging unit or the spectrum detection unit of the optical device 310. Image data, spectrum data and the like after the signal processing are recorded in recording media such as a memory or outputted to display devices such as a monitor or external devices.

It is possible to both of the image of the subject and the spectrum at an arbitrary place of the subject can be easily acquired by applying the optical device according to the embodiment of the present disclosure to electronic apparatuses such as the camera as described above.

The optical device according to the embodiment of the present disclosure has been explained as described above. The present disclosure includes various conceivable modes within a scope not departing from the gist of the present disclosure described in appended claims.

The present disclosure contains subject matter related to that disclosed in Japanese Priority Patent Application JP 2010-266296 filed in the Japan Patent Office on Nov. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device comprising:
   an image-forming optical system configured to form an image of light from a subject;
   an imaging unit configured to receive the image of light formed by the image-forming optical system; wherein the image-forming optical system includes an adjustable diaphragm, the adjustable diaphragm being configured to alter an F-number of the image-forming optical system at the time of detecting the spectroscopic spectrum in relation to an F-number of the image-forming optical system at the time of imaging in the imaging unit;
   a reflection spectroscopic device configured to cover a given area in an imaging area of the imaging unit and convert via reflection the image of light into a spectroscopic spectrum of light, wherein the spectroscopic spectrum of light includes a desired spectroscopic spectrum of light;
   a spectrum detection unit configured to detect the desired spectroscopic spectrum of light while the image of light is received by the imaging unit; and
   a waveguide unit disposed on the imaging unit, and in contact with at least a spectrum detection area of the spectrum detection unit.

2. The optical device according to claim 1, wherein the waveguide unit is further configured to guide at least part of the spectroscopic spectrum of light to the spectrum detection unit.

3. The optical device according to claim 1, wherein, in the light reflected by the reflection spectroscopic device, light in shorter wavelengths than a wavelength range of the desired spectroscopic spectrum is transmitted through the waveguide unit and light in longer wavelengths than the desired spectroscopic spectrum is reflected by the waveguide unit to the outside of the spectrum detection area of the spectrum detection unit.

4. The optical device according to claim 1, wherein the reflection spectroscopic device is integrally formed on a surface of the waveguide unit or the imaging unit.

5. The optical device according to claim 1, wherein the imaging unit is inclined to an optical axis of the image-forming optical system.

6. The optical device according to claim 1, wherein the waveguide unit is configured so that at least a part of a total reflection surface of the waveguide unit is inclined to an upper surface of the imaging area of the imaging unit.

7. The optical device according to claim 1, wherein the reflection spectroscopic device is a diffraction grating, hologram device, or a prism.

8. An electronic apparatus comprising:
   an optical device including
      an image-forming optical system configured to form an image of light from a subject;
      an imaging unit configured to receive the image of light formed by the image-forming optical system; wherein the image-forming optical system includes an adjustable diaphragm, the adjustable diaphragm being configured to alter an F-number of the image-forming optical system at the time of detecting the spectroscopic spectrum in relation to an F-number of the image-forming optical system at the time of imaging in the imaging unit;

a reflection spectroscopic device configured to cover a given area in an imaging area of the imaging unit and convert via reflection the image of light into a spectroscopic spectrum of light, wherein the spectroscopic spectrum of light includes a desired spectroscopic spectrum of light;

a spectrum detection unit configured to detect the desired spectroscopic spectrum of light while the image of light is received by the imaging unit; and a waveguide unit disposed on the imaging unit, and in contact with at least a spectrum detection area of the spectrum detection unit.

9. The electronic apparatus according to claim 8, wherein the waveguide unit is further configured to guide at least part of the spectroscopic spectrum of light to the spectrum detection unit.

10. The electronic apparatus according to claim 8, wherein, in the light reflected by the reflection spectroscopic device, light in shorter wavelengths than a wavelength range of the desired spectroscopic spectrum is transmitted through the waveguide unit and light in longer wavelengths than the desired spectroscopic spectrum is reflected by the waveguide unit to the outside of the spectrum detection area of the spectrum detection unit.

11. The electronic apparatus according to claim 8, wherein the reflection spectroscopic device is integrally formed on a surface of the waveguide unit or the imaging unit.

12. The electronic apparatus according to claim 8, wherein the imaging unit is inclined to an optical axis of the image-forming optical system.

13. The electronic apparatus according to claim 8, wherein the waveguide unit is configured so that at least a part of a total reflection surface of the waveguide unit is inclined to an upper surface of the imaging area of the imaging unit.

14. The electronic apparatus according to claim 8, wherein the reflection spectroscopic device is a diffraction grating, hologram device, or a prism.

15. The optical device according to claim 1, wherein the desired spectroscopic spectrum of light includes a set of wavelength ranges, and wherein each wavelength range is a distinct sub-range between 620 nm to 860 nm.

16. The optical device according to claim 1, wherein the reflection spectroscopic device is one of a plurality of spectroscopic devices, each spectroscopic device being configured to convert via reflection the image of light into a distinct spectroscopic spectrum of light that is received by a designated section of the spectrum detection unit that corresponds only to that spectroscopic device.

17. The optical device according to claim 1, wherein the reflection spectroscopic device has a length that is longer than a wavelength of the desired spectroscopic spectrum of light.

18. The optical device according to claim 1, wherein the reflection spectroscopic device is integrally formed in a cover layer of the imaging area and includes convex portions, each convex portion having a height that corresponds to the surface of the cover layer.

\* \* \* \* \*